United States Patent
Truong et al.

(10) Patent No.: US 10,374,836 B2
(45) Date of Patent: Aug. 6, 2019

(54) METHOD AND APPARATUS FOR DOWNLINK CHANNEL ESTIMATION IN MASSIVE MIMO

(71) Applicant: Huawei Technologies Canada Co., Ltd., Kanata (CA)

(72) Inventors: Kien Trung Truong, Hanoi (VN); Robert Wendell Heath, Jr., Austin, TX (US); Hosein Nikopour, San Jose, CA (US)

(73) Assignee: Huawei Technologies Canada Co., Ltd., Kanata (CA)

( * ) Notice: Subject to any disclaimer, the term of this patent is extended or adjusted under 35 U.S.C. 154(b) by 182 days.

(21) Appl. No.: 14/925,588

(22) Filed: Oct. 28, 2015

(65) Prior Publication Data

US 2017/0126437 A1    May 4, 2017

(51) Int. Cl.
| | |
|---|---|
| *H04B 7/06* | (2006.01) |
| *H04L 25/02* | (2006.01) |
| *H04W 72/04* | (2009.01) |
| *H04B 7/0456* | (2017.01) |

(52) U.S. Cl.
CPC ....... *H04L 25/0202* (2013.01); *H04B 7/0456* (2013.01); *H04B 7/0619* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 7,912,141 | B2* | 3/2011 | She | H04L 1/0675 375/267 |
| 8,351,521 | B2* | 1/2013 | Lakkis | H04B 7/0491 375/260 |
| 8,615,050 | B2* | 12/2013 | Lakkis | H04B 7/0491 375/260 |
| 8,897,386 | B2* | 11/2014 | Yeh | H04B 7/0639 375/285 |
| 8,982,973 | B2* | 3/2015 | Chen | H04B 7/0639 375/260 |

(Continued)

FOREIGN PATENT DOCUMENTS

CN    102763447 A    10/2012

OTHER PUBLICATIONS

Kuo, P.-H., et al., "Compressive Sensing Based Channel Feedback Protocols for Spatially-Correlated Massive Antenna Arrays," 2012 IEEE Wireless Communications and Networking Conference: PHY and Fundamentals, Apr. 1-4, 2012, pp. 492-497.

(Continued)

*Primary Examiner* — Gregory B Sefcheck
(74) *Attorney, Agent, or Firm* — Slater Matsil, LLP

(57) ABSTRACT

Method and apparatus for downlink (DL) channel estimation in massive MIMO are provided. A base station (BS) support massive MIMO may select a dictionary for a user equipment (UE) in its cell and transmit information for constructing the dictionary to the UE. The UE constructs the dictionary based on the information received and performs compressed sensing (CS)-based DL channel estimation for the BS. The UE also sends feedback information to the BS, which include information that is useful for determination of the dictionary by the BS.

38 Claims, 5 Drawing Sheets

(56) References Cited

U.S. PATENT DOCUMENTS

| | | | | |
|---|---|---|---|---|
| 9,020,518 B2* | 4/2015 | Huang | H04B 7/0634 |
| | | | 370/310 |
| 9,031,149 B2* | 5/2015 | Park | H04B 7/0456 |
| | | | 375/260 |
| 9,036,727 B2* | 5/2015 | Tesanovic | H04B 7/0639 |
| | | | 375/259 |
| 9,077,402 B2* | 7/2015 | Lee | H04L 1/06 |
| 9,100,068 B2* | 8/2015 | Lakkis | H04B 7/0491 |
| 9,106,290 B2* | 8/2015 | Ni | H04B 7/0482 |
| 9,124,322 B2* | 9/2015 | Yang | H04B 7/0413 |
| 9,172,446 B2* | 10/2015 | Harel | H04L 5/0073 |
| 9,178,590 B2* | 11/2015 | Kuo | H04B 7/0663 |
| 9,214,993 B2* | 12/2015 | Lee | H04B 7/0456 |
| 9,225,404 B2* | 12/2015 | Shirani-Mehr | H04L 5/0085 |
| 9,231,746 B2* | 1/2016 | Valentin | H04L 1/0026 |
| 9,287,948 B2* | 3/2016 | Kim | H04W 4/005 |
| 9,319,116 B2* | 4/2016 | Boccardi | H04B 7/0417 |
| 9,356,668 B2* | 5/2016 | Zhang | H04B 7/0456 |
| 9,379,873 B2* | 6/2016 | Kang | H04B 7/0626 |
| 9,414,371 B2* | 8/2016 | Pi | H04W 72/042 |
| 9,425,876 B2* | 8/2016 | Yu | H04B 7/0478 |
| 9,473,227 B2* | 10/2016 | Ko | H04B 7/0456 |
| 9,491,654 B2* | 11/2016 | Ko | H04B 7/0456 |
| 9,496,941 B2* | 11/2016 | Liu | H04B 7/0626 |
| 9,537,631 B2* | 1/2017 | Park | H04L 5/0048 |
| 9,647,735 B2* | 5/2017 | Sajadieh | H04B 7/0456 |
| 9,647,794 B2* | 5/2017 | Baker | H04L 1/0026 |
| 9,654,192 B2* | 5/2017 | Yu | H04B 7/0452 |
| 9,654,195 B2* | 5/2017 | Rahman | H04B 7/0469 |
| 9,674,724 B2* | 6/2017 | Kim | H04W 24/10 |
| 9,755,797 B2* | 9/2017 | Wu | H04L 5/0023 |
| 9,774,430 B2* | 9/2017 | Park | H04L 5/0048 |
| 9,794,817 B2* | 10/2017 | Ko | H04B 7/0626 |
| 9,813,133 B2* | 11/2017 | Ko | H04B 7/0626 |
| 10,038,528 B2* | 7/2018 | Jiang | H04L 5/0048 |
| 2009/0067529 A1 | 3/2009 | Mielczarek et al. | |
| 2013/0163645 A1* | 6/2013 | Kuo | H04B 7/0663 |
| | | | 375/219 |
| 2014/0334567 A1 | 11/2014 | Khojastepour et al. | |
| 2015/0188678 A1* | 7/2015 | Wu | G01S 5/0036 |
| | | | 370/329 |
| 2015/0372729 A1* | 12/2015 | Tajima | H04B 7/0456 |
| | | | 375/267 |
| 2017/0019157 A1* | 1/2017 | Mo | H04B 7/0456 |
| 2017/0086080 A1* | 3/2017 | Sun | H04L 67/104 |
| 2017/0279508 A1* | 9/2017 | Truong | H04B 7/0626 |
| 2017/0295001 A1* | 10/2017 | Chen | H04L 5/0023 |

OTHER PUBLICATIONS

Xu, Jing, "Research on channel state information acquisition based on compressive sensing for 5G Systems," Chinese Master's Theses Full-text Database Information Science and Technology. Aug. 15, 2015, 3 pages.

Ye, Xinrong, "Research on Sparse Channel Estimation in MIMO-OFDM Systems Based on Compressed Sensing Reconstruction Algorithms," Chinese Doctoral Dissertations Full-text Database Information Science and Technology. May 15, 2015, 3 pages.

* cited by examiner

METHOD AND APPARATUS FOR DOWNLINK CHANNEL ESTIMATION IN MASSIVE MIMO

TECHNICAL FIELD

The present invention relates generally to channel estimation, and in particular embodiments, to techniques and mechanisms for downlink channel estimation in a massive multiple-input multiple-output (MIMO) system.

BACKGROUND

Massive MIMO is a candidate technology for 5G cellular networks. In a massive MIMO system, base stations (BSs) are equipped with more antennas than in conventional systems, e.g., each base station may have 20 to 100 antennas or more, thus a large number of users are served simultaneously using the multiuser MIMO techniques. Massive MIMO has advantages of being less affected by thermal noise and fast fading, simplified multiuser processing, and reduced transmit power and high sum-rates.

Channel state information (CSI) is critical in massive MIMO systems, and is used to separate data to different users through transmit/receive precoding. Conventionally, in a massive MIMO system that operates in a time division duplexing (TDD) mode, it is assumed that channel reciprocity holds, and consequently, uplink (UL) and downlink (DL) channels are assumed to be the same, which allows a base station to estimate DL channels to its associated users based on UL pilots, thus avoiding explicit CSI feedback. Channel reciprocity actually does not hold in massive MIMO systems. For example, in TDD-based massive MIMO systems, there are non-ideal hardware and calibration errors, and in frequency duplex division (FDD) based massive MIMO systems, different carrier frequencies are used on UL and DL. In a conventional approach for DL channel estimation in a massive MIMO system, a user estimates a DL channel based on DL training sequences received from its associated base station and sends DL CSI back to the base station for precoding design.

SUMMARY

Technical advantages are generally achieved, by embodiments of this disclosure which describe downlink channel estimation in a massive multiple-input multiple-output (MIMO) system.

In accordance with an embodiment, a method is provided for wireless communications. The method includes transmitting, by a base station, information for constructing a first dictionary to at least a first user equipment (UE) for compressed sensing (CS)-based downlink (DL) channel estimation. The base station supports massive MIMO. The method further includes receiving, by the base station, feedback information from at least the first UE. The feedback information includes information corresponding to determination of the first dictionary. A base station for performing this method is also provided.

In accordance with another embodiment, a method includes receiving, by a UE, information for constructing a dictionary used for CS-based DL channel estimation of a base station supporting massive MIMO. The method also includes performing, by the UE, CS-based DL channel estimation using the dictionary constructed from the information. The method further includes transmitting, by the user equipment, feedback information to the base station, where the feedback information includes information useful for determination of the dictionary. A UE for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In a massive multiple-input multiple-output (MIMO) system, a compressed sensing (CS) based channel estimation method may be used to estimate downlink (DL) channel from a base station (BS) to a user equipment (UE). The CS based channel estimation method calculates a sparsified DL channel vector g using a set of training sequences, which are also known as pilots, and a dictionary D, then estimates a DL channel h corresponding to the sparsified DL channel vector g and the dictionary D. Conventionally, the dictionary D is assumed to be fixed and is agreed in advance between a BS and a UE. However, DL channels may vary with a series of factors such as user location, channel quality and path loss, and the dictionary D may vary for different user equipments (UEs). Aspects of the present disclosure provide a method for CS based DL channel estimation in a massive MIMO system, where a BS may determine a dictionary for each of UEs that the BS is serving, and transmit information of the determined dictionary to each of the UEs. The BS may determine a dictionary for a UE based on feedback information received from the UE. A UE performing DL channel estimation may keep track of information about its preferred dictionary and performance of each dictionary the UE has used in DL channel estimation. Such information may be fed back to the BS with which the BS may determines a preferred dictionary for the UE so that DL channel estimation performed by the UE with the dictionary may result in more accurate CSI.

Figure 1:
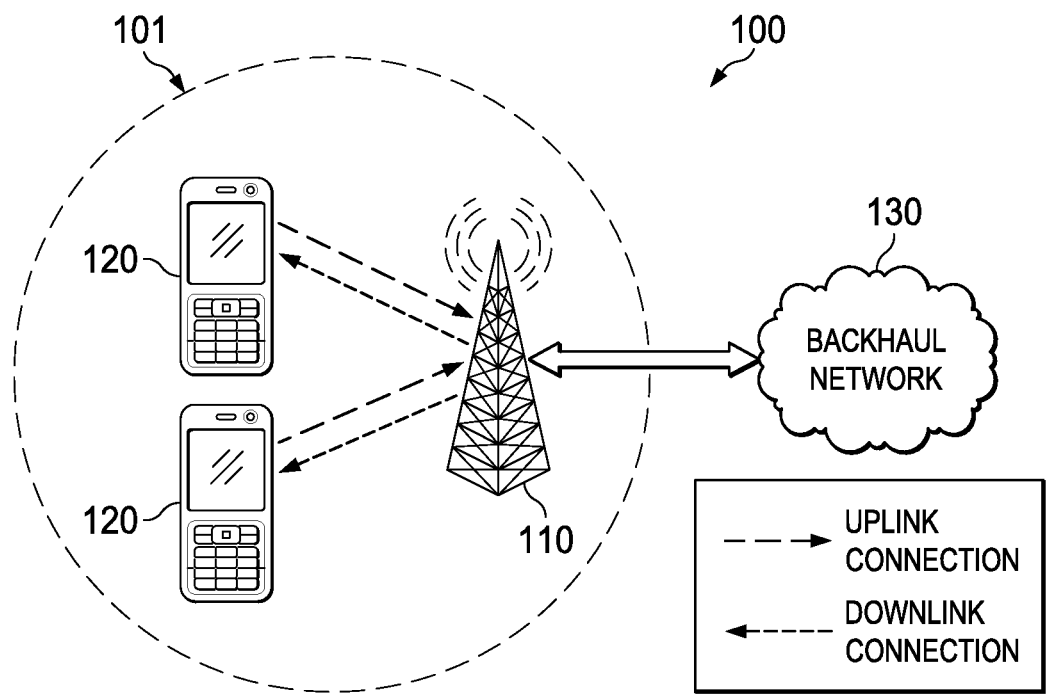
FIG. 1 illustrates a diagram of an embodiment wireless communications network.

FIG. 1 illustrates a wireless communications network 100 for communicating data. The network 100 comprises a base station 110 having a coverage area 101, a plurality of mobile devices 120, and a backhaul network 130. The base station 110 supports massive multiple-input multiple-output (MIMO). As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

As already known in the art, a sparse structure of a massive MIMO channel may be directly exposed when the vector of coefficients of the massive MIMO channel has only several non-zero entries. For example, an s-sparse channel vector $h \in C^{N_t \times 1}$ may have only s non-zero entries, where $N_t$ is the number of antennas of a BS and $s \ll N_t$. Generally, a sparse structure of a channel is hidden and may be revealed through a representation based on a dictionary, i.e., h=gD, where h is a channel vector, $g \in C^{N \times 1}$ is an s-sparse vector ($s \ll N_t \leq N$), and $D \in C^{N_t \times N}$ is the dictionary. When the dictionary D is known, the channel vector h may be estimated based on the sparse vector g calculated and the dictionary D. When the dictionary D is an orthonormal basis with $N=N_t$, D is also known as a sparsifying basis. The dictionary D may not be orthonormal and may be over-complete with $N_t < N$. A directly exposed sparse channel vector h may be viewed as a hidden one where D is an identity matrix with size $N_t \times N_t$.

A conventional approach for downlink (DL) channel estimation is to transmit DL training sequences by a base station (BS) to a user equipment (UE) u that the BS is serving. The user equipment u may estimate the DL channel based on the DL training sequences received from the base station, and then send the estimated DL channel state information (CSI) back to the base station. A received training signal at the user equipment u in case of a single-cell may be represented by:

$$y_u^T = h_u^T P + v_u^T = g_u^T D_u^T P + v_u^T \qquad (1)$$

where $h_u^T$ is a DL channel vector to be estimated by the UE u, P is a predefined training sequence matrix, $v_u^T$ is noise, $g_u^T$ is a sparsified DL channel vector, $D_u^T$ is a dictionary, and the superscript "T" represents the matrix transpose.

A compressed sensing (CS) based method performs DL channel estimation based on Equation (1) and attempts to estimate a sparsified DL channel vector g by first solving an optimization problem in the following:

$$g_u = \min_{g \in C^{N \times 1}} \|g\|_0 \quad \text{s.t.} \quad \|y_u^T - g^T D_u^T P\|_2^2 \leq \varepsilon \qquad (2)$$

Then the CS based method computes a DL channel vector h by multiplying the dictionary D and the estimated sparsified DL channel vector g, i.e. h=D g. For the CS based method, it is crucial that a user equipment u knows the information about the dictionary D and the training sequence matrix P.

Conventional methods for obtaining DL CSI at a base station cause a large amount of overhead, since DL training grows in proportion to the number of antennas $N_t$ at the base station, which requires a lot of time in general, i.e. channel resources, for sending DL training sequences by the base station and also time for sending back DL CSI, and thus reduces the resources allocated for actual data transmission.

For the CS based method, the number of required training symbols for high-quality channel estimation is approximately proportional to a channel's sparsity degree, not the channel's size. For accurate DL channel estimation, a user has to use a proper dictionary that corresponds to the sparsest representation of a channel to be estimated. The choice of a dictionary is critical to achieving good performance in the CS based channel estimation. A good dictionary generally may be one that provides sparse channel estimates and low estimation errors. In general, finding a good dictionary is challenging. Conventional dictionary learning approaches may require too many channel realizations to be practical. If a base station has an "unconstrained" dictionary, e.g., a dictionary that does not necessarily have any special structure, it may take a lot of overhead to inform a UE about a suitable dictionary.

Figure 2:
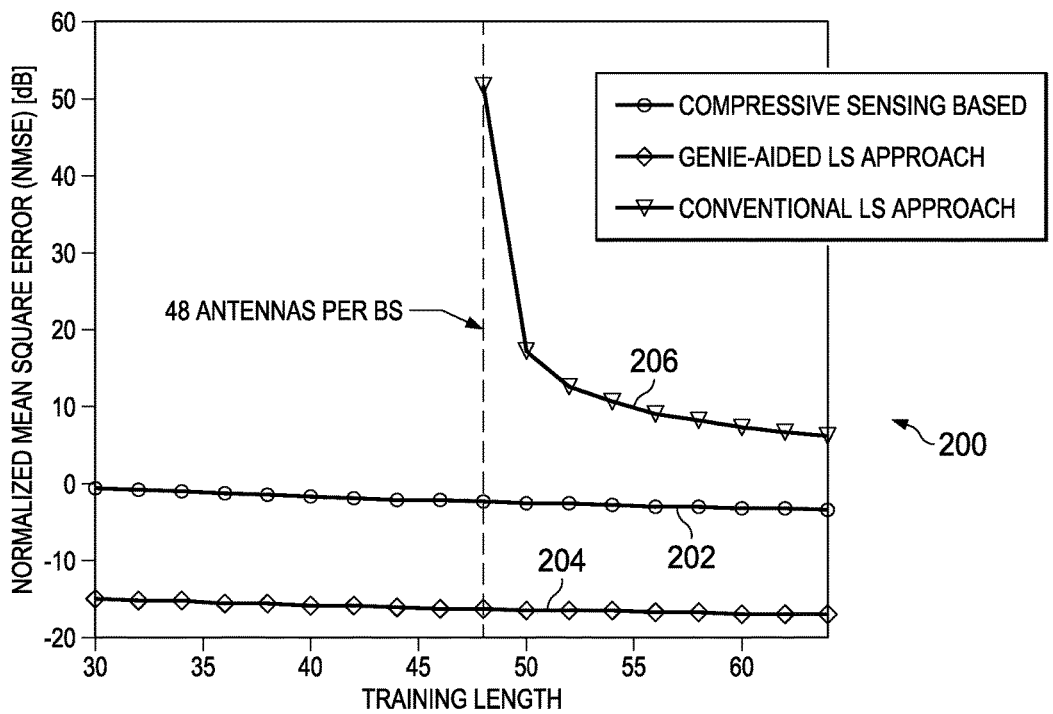
FIG. 2 illustrates a graph of a normalized mean square error (NMSE) of embodiment DL channel estimations.

FIG. 2 illustrates a graph 200 of a normalized mean square error (NMSE) of a DL channel estimation varying with training length according to an embodiment of the present disclosure. In other words, FIG. 2 illustrates accuracy of DL channel estimation using different DL channel estimation methods. Let $\hat{h}$ be an estimate of the DL channel vector h obtained by a DL channel estimation method. The normalized mean square error of this channel estimation method is defined by:

$$NMSE(h) = E\left[\frac{\|h - \hat{h}\|_2^2}{\|h\|_2^2}\right],$$

where E[ ] is the expectation operation over many channel realizations. The DL channel estimation is performed in a network with a plurality of base stations. Each base station has $N_t$ antennas. In this example, user equipment is dropped randomly in each cell, flat-fading channels are blocked, and interference is treated as uncorrelated additive noise in the DL channel estimation. Curve 202 represents the NMSE with the DL channel estimated using a compressed sensing (CS) based method. Curve 204 represents the NMSE of the DL channel estimation using a Genie-aided least squares (LS) method, and curve 206 represents the NMSE with the DL channel estimated using a conventional LS approach. As can be seen from FIG. 2, the CS based method provides better accuracy in DL channel estimation than the conventional LS based method, and the conventional LS based method requires a training length larger than the number of antennas $N_t$. It may also be seen from FIG. 2 that for the same accuracy of data recovery, the use of the CS-based method with a suitable dictionary may reduce the required number of measurements or training length, which will consequently lead to a reduction in pilot overhead in DL training and in uplink feedback overhead.

Figure 3:
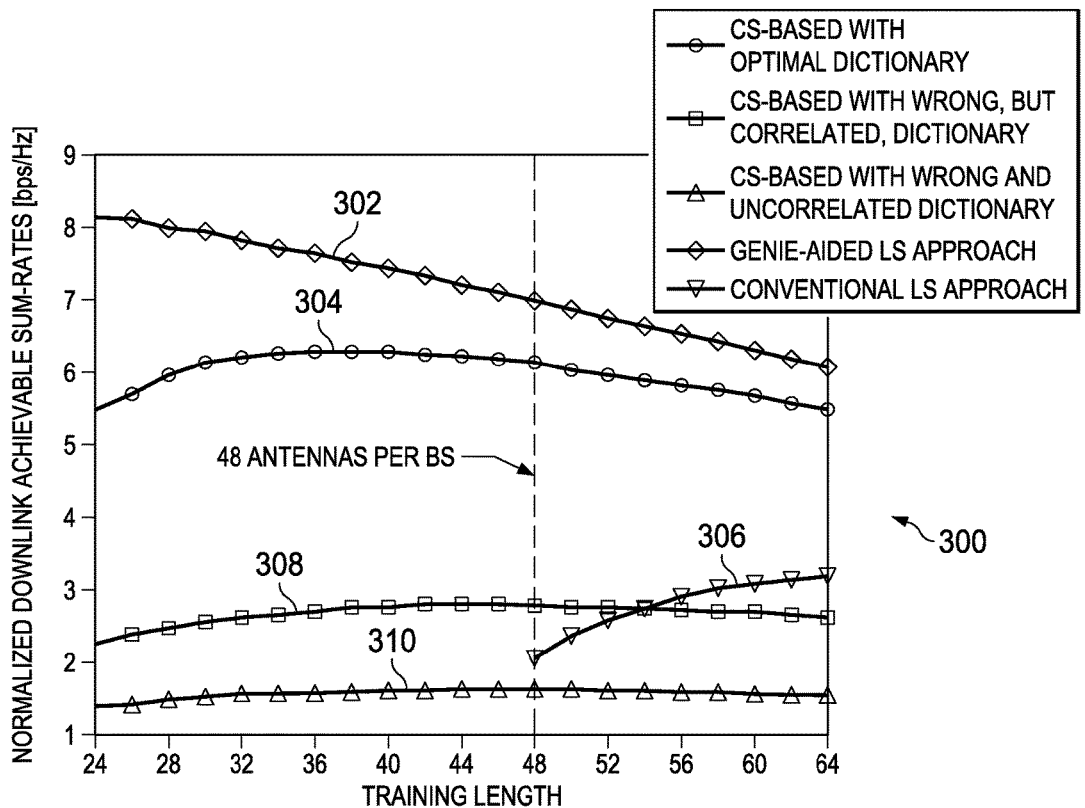
FIG. 3 illustrates a graph of normalized downlink achievable sum-rates resulted from embodiment DL channel estimations.

FIG. 3 illustrates a graph 300 of normalized downlink achievable sum-rates varying with training length according to an embodiment of the present disclosure. FIG. 3 illustrates curves of normalized downlink achievable sum-rates with DL channel estimated using different channel estimation methods. The normalized downlink achievable sum-rates are calculated by $$R = \frac{(T_{frame} - T_{overhead})}{T_{frame}} \log_2(1 + SINR),$$

where $T_{frame}$ is the transmission time of a frame, $T_{overhead}$ is the transmission time of overhead carried in the frame, and SINR is the signal to interference plus noise ratio. Curves 302, 304, 306, 308 and 310 represent the normalized downlink achievable sum-rates with DL channel estimation performed using a Genie-aided LS method, a CS-based method with an optimal dictionary, a conventional LS method, a CS-based method with a wrong but correlated dictionary, and a CS-based method with a wrong and uncorrelated dictionary, respectively. In one embodiment, an optimal dictionary is obtained via a controlled genaration of channel coefficients and corresponds to one of the sparsest representations of the generated channel vector. The curves are obtained with assumptions that feedback of both dictionary information and CSI estimate is received without any errors and delays, and precoders are designed based on the DL CSI obtained from the users. Interference is treated as uncorrelated additive noise in SINR computation, and SINR includes CSI estimation errors but not including feedback errors. As can be seen from FIG. 3, for CS-based DL channel estimation methods, there exists an optimal training length that generally maximizes the normalized sum-rates. The reason is that increasing training length improves quality of DL channel estimation but reduces time for actual data transmission, which results in a generally optimal operating point for training length.

Figure 4A:
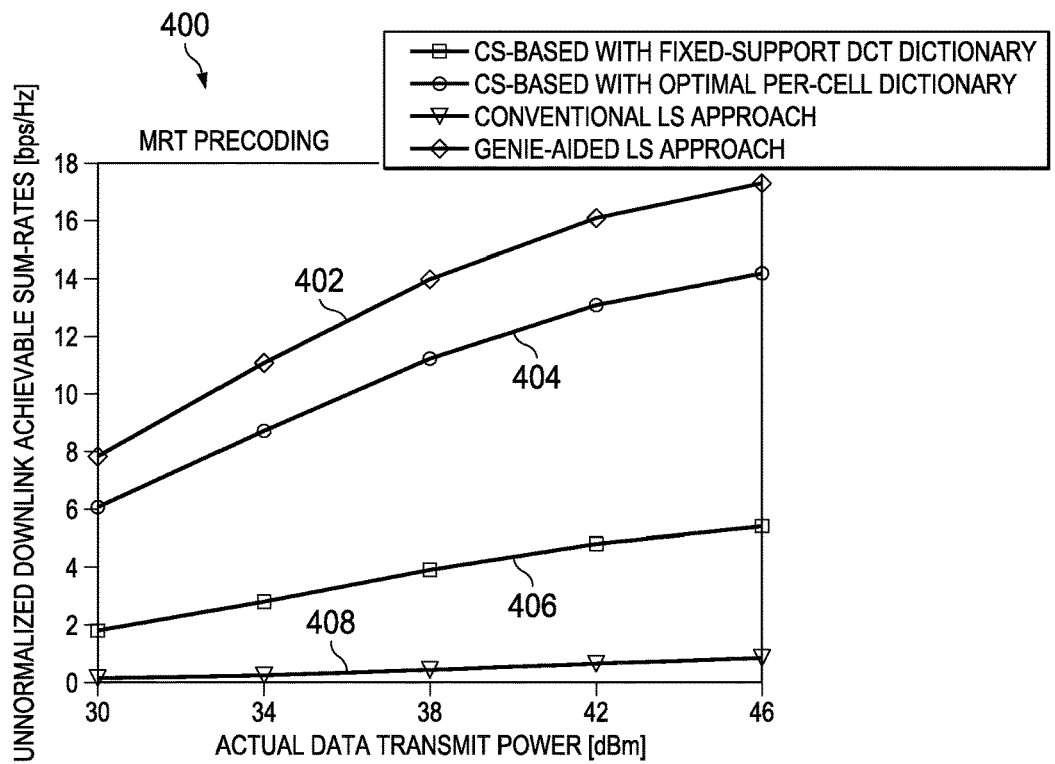
FIG. 4A illustrates a graph of unnormalized downlink achievable sum-rates resulted from embodiment DL channel estimations.
Figure 4B:
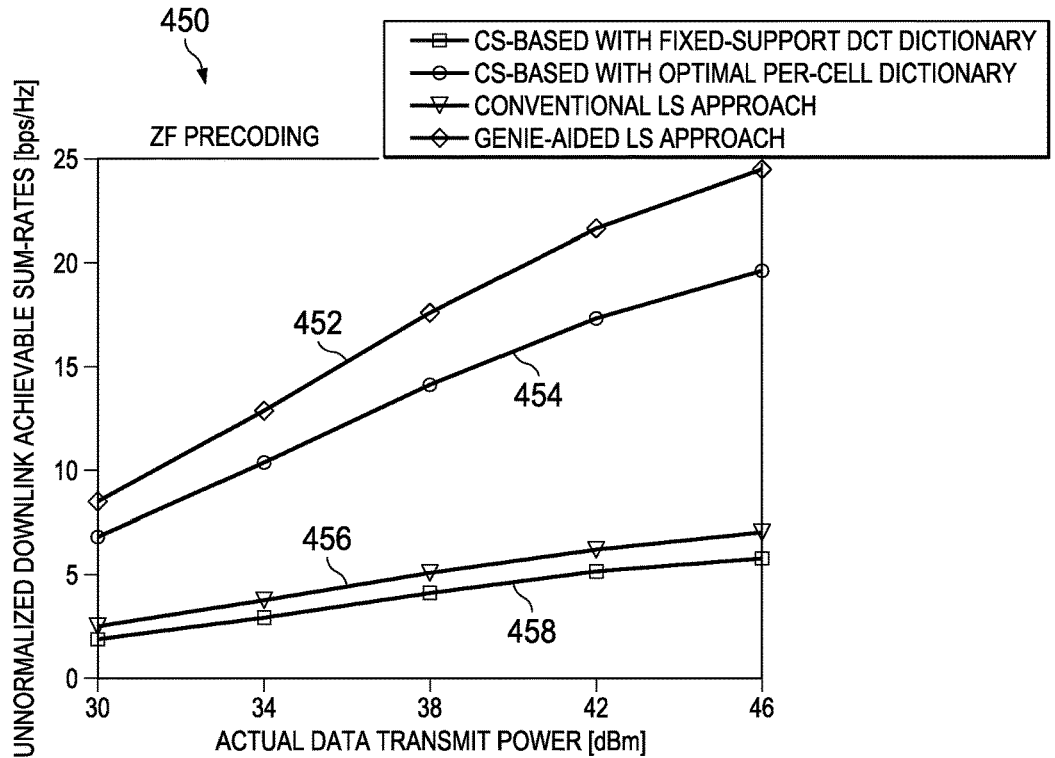
FIG. 4B illustrates another graph of unnormalized downlink achievable sum-rates resulted from embodiment DL channel estimations.

FIG. 4A illustrates a graph 400 of unnormalized downlink achievable sum-rates varying with actual data transmit power using maximum ratio transmission (MRT) precoding. The unnormalized downlink achievable sum-rates are calculated by $R=\log_2(1+SINR)$. Curves 402, 404, 406 and 408 represent unnormalized downlink achievable sum-rates with DL channel estimation performed using a Genie-aided LS approach, a CS-based method with an optimal per-cell dictionary, a CS-based method with a fixed-support discrete cosine transformation (DCT) dictionary, and a conventional LS method, respectively. It can be seen that the CS-based method with an optimal per-cell dictionary produces better downlink achievable sum-rates than with a fixed dictionary. FIG. 4B illustrates a graph 450 of unnormalized downlink achievable sum-rates varying with actual data transmit power using zero forcing precoding. Curves 452, 454, 456 and 458 represent unnormalized downlink achievable sum-rates with DL channel estimation performed using a Genie-aided LS approach, a CS-based method with an optimal per-cell dictionary, a conventional LS method, and a CS-based method with a fixed-support discrete Fourier transformation (DFT) dictionary, respectively. It has been shown that universal sparsifying bases such as the DFT matrix and the DCT matrix used in the CS-based methods do not usually provide the sparsest representation of channels, and an optimal dictionary or sparsifying basis depends on array geometry and local scattering environment.

Figure 5A:
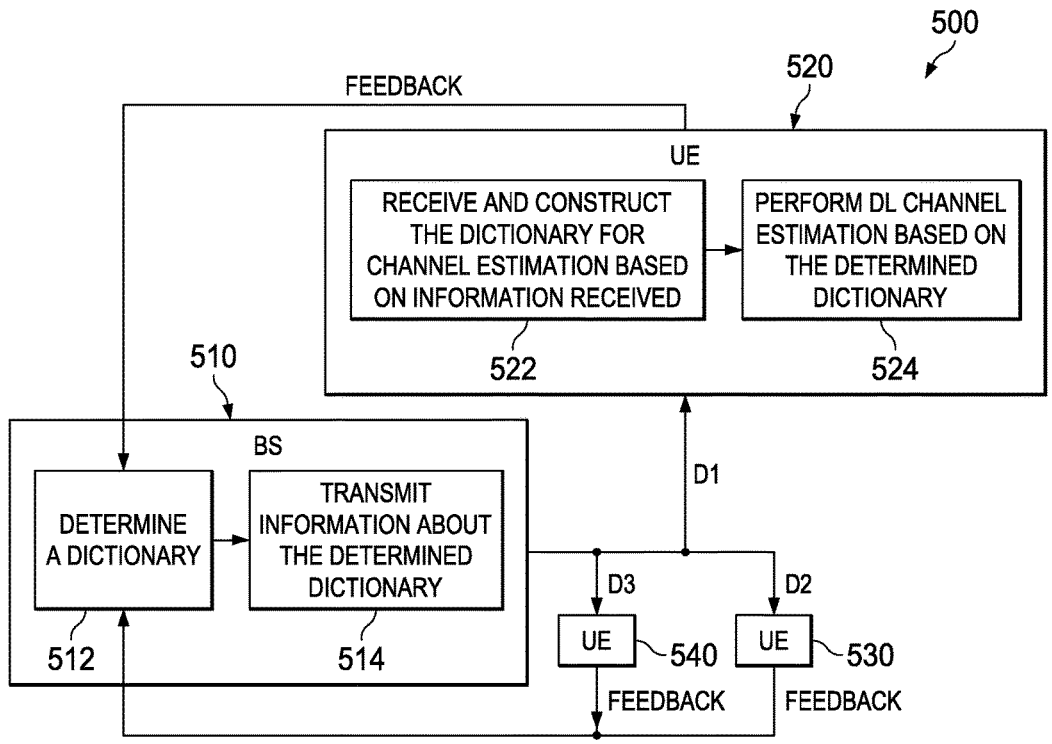
FIG. 5A illustrates a diagram of an embodiment method for downlink channel estimation in a wireless communications network.

FIG. 5A illustrates a diagram 500 of an embodiment wireless communication network for downlink channel estimation. In this example, the DL channel is estimated using the CS-based channel estimation method. As discussed above, the CS based channel estimation method may first estimate a sparsified DL channel vector g according to some training sequences and a dictionary D, then compute a DL channel vector h utilizing the estimated sparsified DL channel vector g and the dictionary D. The communications network, as shown in FIG. 5A, includes a base station (BS) 510, a first user equipment (UE) 520, a second UE 530, and a third UE 540. The BS 510 supports massive multiple-input multiple-output (MIMO), and establishes uplink and/or downlink connections with the UEs 520, 530 and 540.

For a UE served by the BS 510, such as the UE 520, UE 530, UE 540, to perform a DL channel estimation, the UE may need to have information about the dictionary D. The BS 510 may be configured to determine or select, a dictionary D for each of the UEs 520, 530 and 540 (Block 512), and to transmit information about the determined dictionary D with each of the UEs 520, 530 and 540 (Block 514). For example, as shown in FIG. 5A, the BS 510 may determine or select a dictionary D1, D2 and D3 for the UEs 520, 530 and 540, respectively, and transmit the dictionary D1, D2 and D3 to the UEs 520, 530 and 540, respectively. In some embodiments, the BS 510 may determine or select a dictionary D on a per-cell basis, in which all user equipment in the cell of the BS 510 uses the same dictionary. In this case, the dictionaries D1, D2 and D3 are the same. Alternatively, a plurality of user equipments served by the BS 510 may be grouped into different groups such that the user equipment in one group experience a common array geometry and local scattering environment, in which case the BS 510 may determine or select a dictionary for DL channel estimation on a per-group basis. For example, if UE 520 and UE 540 are grouped into a first group, and UE 530 is in a second group, the BS 510 may determine that the first group of UE uses a same dictionary, and the second group uses a different dictionary. Thus, in this case, D1 is the same as D3, and D2 is different from D1 and D3. In other embodiments, a dictionary used for DL channel estimation may be determined on a per-user basis, i.e., the BS 510 may determine or select a dictionary specifically for each of the UEs that the BS 510 is serving. For example, each of the UEs 520, 530 and 540 may have a different dictionary used for DL channel estimation, i.e., dictionaries D1, D2 and D3 may be different from each other. Whether a dictionary is determined or selected on a per-cell basis, per-user basis or per-group basis may be based on an initial design of a base station, and/or may also be based on feedback from user equipments served by the base station. The BS 510 may determine or select a dictionary for a UE based on information including user location, channel quality indicators, path loss, array geometry, and scattering environment. In one embodiment, the BS 510 may determine or select a dictionary on a per-cell basis, and change to a per-user basis according to feedback information from one or more UEs. Alternatively, the BS 510 may transmit information about multiple dictionaries to a UE, and the UE may reconstruct each of the multiple dictionaries and select one of the dictionaries to perform DL channel estimation, e.g., by comparing DL channel estimation of one dictionary with another. By trying different dictionaries, the user may select one dictionary that provides better channel estimation. In other embodiments, the BS 510 may randomly select a dictionary for each of the UEs 520, 530 and 540 initially, and determine or select a different dictionary for a UE based on feedback information of the UE regarding performance of the selected dictionary.

In some embodiments, information about a dictionary used to perform DL channel estimation may be transmitted to each of the UEs 520, 530 and 540 periodically or upon request of each of the UEs 520, 530 and 540. Alternatively, information about a dictionary used by a UE for DL channel estimation may be transmitted to the UE upon occurrence of a system event. For example, a dictionary is sent by a BS when the UE enters the base station. In other embodiments, information about a dictionary determined or selected on a per-cell basis may be broadcast to each of the UEs 520, 530 and 540 in the same cell of the BS 510 periodically.

In some embodiments, the BS 510 may select a dictionary from a codebook of multiple dictionaries for a UE or a plurality of UEs. In one embodiment, a codebook of dictionaries may include a set of indexed and predetermined dictionaries. For example, a codebook of dictionaries may include a set of eight dictionaries, indexed as D1, D2, . . . , D8. The codebook of dictionaries may be known to both the base station 510 and the UEs. For example, both the entries of the eight dictionaries and an indexing system of the codebook (e.g., the order of the dictionaries in the set) are shared in advance between the base station 510 and the UEs. In one embodiment, the codebook may be stored in both the BS 510 and each of the UEs 520, 530 and 540. Alternatively, each of the UEs 520, 530 and 540 may generate the codebook from a set of algorithmic descriptions. Thus the base station 510 and the UEs may exchange the index of a dictionary instead of the dictionary itself. For example, when the BS 510 selects one or more dictionaries from the codebook for a UE, the BS 510 may transmit to the UE an index of a dictionary or a set of indexes of a set of dictionaries for constructing the selected dictionary or dictionaries from the codebook. In one example, upon receipt of the set of codebook indexes, the UE may construct the dictionaries from the codebook according to the set of codebook indxes received. In this case, the set of codebook indexes constitutes the information about the dictionary transmitted by the BS 510. As discussed above, the BS 510 may broadcast the set of codebook indexes to all UEs in the cell of the BS 510 if all the UEs use the same dictionary for DL channel estimation, or transmit the set of codebook indexes to a UE for which the dictionary is selected. In some other embodiments, the information of a dictionary may include one or more entry values of the matrix of the dictionary, and the BS 510 may transmit the values in a predefined order to a UE or a plurality of UEs. A UE receiving the entry values may consequently construct the dictionary matrix using the entry values received. Alternatively, the information of a dictionary may include a mathematical description that allows the UE to reconstruct the dictionary by calculating each of the dictionary entries.

Each of the UEs 520, 530 and 540 may be configured to receive a dictionary from the BS 510, and construct or generate a dictionary for performing a DL channel estimation according to the information about the dictionary transmitted from the BS 510 (Block 522, not shown for UE 530 and UE 540), and to perform DL channel estimation based on a constructed dictionary (Block 524, not shown for UE 530 and UE 540). As discussed above, each of the UEs 520, 530 and 540 utilizes the CS based channel estimation approach to estimate the DL channel of the BS 510. The DL channel estimation may be performed by a UE periodically or upon request from a BS. In some embodiments, a UE may estimate the DL channel using a plurality of dictionaries, periodically or based on a request from the BS 510. For example, a UE may calculate multiple sparsified DL channel vectors, e.g., g1, g2, . . . , gn, based on n dictionaries D1, D2, . . . , Dn using the CS based method, and select a sparsified DL channel vector from the multiple sparsified DL channel vectors g1, g2, . . . , gn that has the least number of non-zero entries for performing DL channel estimation. The n dictionaries may be generated by the UE according to a codebook, or provided by a BS. The UE may select a preferred dictionary from the n dictionaries according to some predefined criteria, such as DL channel estimation performance or quality. For example, the UE may select a preferred dictionary which results in a calculated sparsified DL channel vector g with a least number of non-zero entries. The UE may perform DL channel estimation using the preferred dictionary, and may also transmit information about the preferred dictionary to the BS. A preferred dictionary of a UE may vary depending communication environment, and the UE may keep track of the preferred dictionary and the quality of each of the dictionaries.

Each of the UEs 520, 530 and 540 may further be configured to transmit feedback information to the BS 510. The feedback information may include DL channel state information (CSI). In one embodiment, the feedback information may include information about a sparsified DL channel vector g, for example, locations of non-zero entries (or sparse coefficients) of the sparsified DL channel vector g and the values of those non-zero entries. In one embodiment, the non-zero coefficients may be quantized before they are transmitted to the BS 510. The non-zero coefficients may also be sent to the BS 510 using analog feedback. The BS 510 may calculate a DL channel vector h using the sparsified DL channel vector g and the dictionary used for calculating this sparsified DL channel vector g. There may be a maximum number of sparse coefficients for an estimated sparsified DL channel vector g. When the BS 510 has $N_t$ antennas and a sparsified DL channel vector g calculated by UE has a length of N, transmitting the sparse coefficients of the sparsified DL channel vector g to the BS 510 requires up to (N log2 $N_t$) bits. The number of sparse coefficients (i.e., sparsity order) may vary for each calculation performed by a UE. In some embodiments, the number of sparse coefficients may also be sent to the BS 510.

In some embodiments, the feedback information from a UE may also include information that a base station may consider or use in determination of a dictionary for the UE for DL channel estimation. In one embodiment, each of the UEs associated with a BS may send feedback information to the BS so that the base station may determine or select a generally "best" dictionary for all UEs in the cell of the BS. In this case, the selected dictionary may not be the "best" for an individual UE in the cell. In another embodiment, a UE may transmit feedback information that includes information about a dictionary that the UE prefers and/or quality or performance of dictionaries that the UE has used. A UE may provide such feedback information to a base station upon a request from the BS or periodically. In some embodiments, a preferred dictionary of a UE may be learned at the UE. In one embodiment, a UE may try different dictionaries for many channel realizations and determine a preferred one. For example, as discussed above, a UE may select a preferred dictionary from a plurality of dictionaries by comparing CS-based DL channel estimation performance of each of the dictionaries. The plurality of dictionary may be generated from a codebook known to both the UE and its serving BS. In another embodiment, the UE may pick a preferred dictionary according to DL channel estimation results obtained using different channel estimation approaches. A UE may also keep track of the performance of each dictionary that the UE has used in DL channel estimation, which, for example, may include a residual error, and/or the number of sparse coefficients of a sparsified DL channel vector g calculated according to a respective dictionary. In one embodiment, a UE may concatenate multiple dictionaries to build a longer or larger dictionary, which may be used to better capture sparsity. The UE may also provide feedback information to the BS indicating the concatenation of multiple dictionaries. For example, the feedback information may include indexes of the concatenated dictionaries and a concatenated order of the indexes. The feedback information may be used by the BS 510 to determine a dictionary for a specific UE. As illustrated in FIG. 3 and FIG. 4, the CS based DL channel estimation method has higher downlink achievable sub-rates when a generally optimal dictionary is used. Information regarding a preferred dictionary of a UE or quality of a plurality of dictionaries that the UE has used is helpful for the BS 510 to select a preferred dictionary or a dictionary with a higher performance for the UE, thus the UE may perform DL channel estimation with better accuracy or higher quality.

As illustrated in FIG. 3, for CS-based DL channel estimation methods, there is an optimal training length that generally maximizes the normalized sum-rates. In some embodiments, the training length, or the amount of training, for CS-based DL channel estimation may be adjusted based on performance of DL channel estimations. For example, the training length may be increased when multiple DL channel estimations result in large estimation errors. A UE may transmit the estimation error as feedback information to a BS, based on which the BS may adjust the amount of training accordingly. In principle, the training length may also be adjusted based on distance or average received signal strength of multiple user equipment.

Figures 5B, 5C:
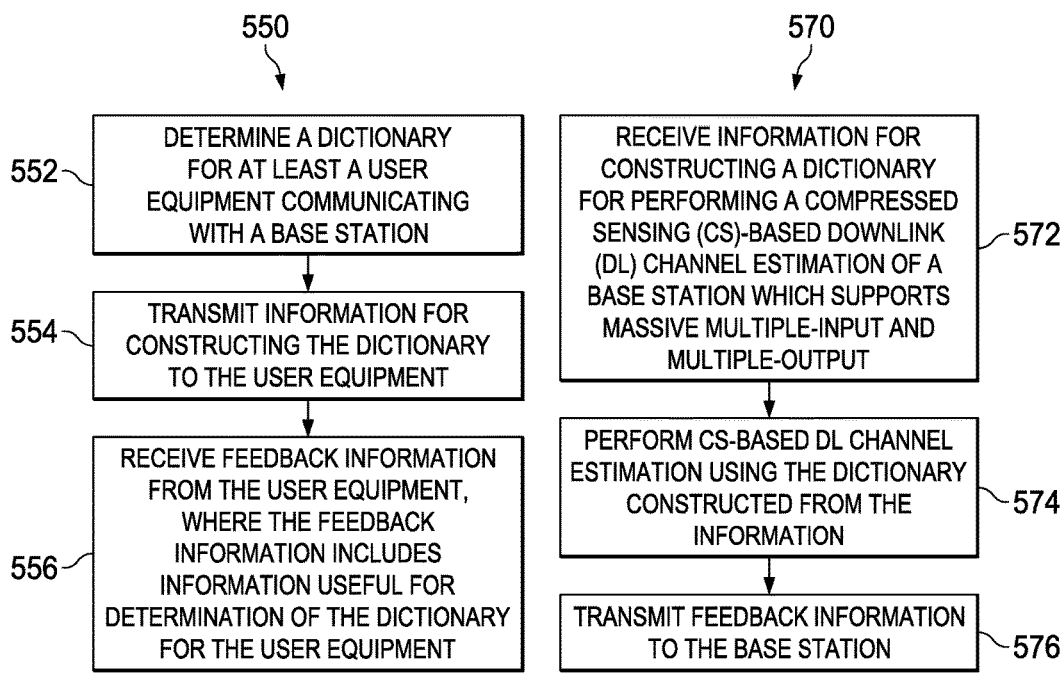
FIG. 5B illustrates a flow chart of an embodiment method for wireless communications.
FIG. 5C illustrates a flow chart of another embodiment method for wireless communications.

FIG. 5B illustrates a flow chart of an embodiment method 550 for wireless communications. The method 550 starts with Step 552 where a base station supporting massive multiple-input and multiple-output (MIMO) determines a dictionary for at least one user equipment communicating with the base station. The dictionary is used for the at least one user equipment to perform compressed sensing based downlink channel estimation. In Step 554, the base station transmits information for constructing the dictionary to the at least one user equipment. The information for constructing the dictionary may be used by the user equipment to construct the dictionary and perform CS-based DL channel estimation according to the constructed dictionary. The dictionary may be determined and transmitted as described in the embodiments of the present disclosure. The base station may also receive, in Step 556, feedback information from the user equipment. The feedback information may include information that the base station may use to determine the dictionary for the user equipment. The feedback information, as described above, may also include, e.g., values of non-zero entries of a sparsified channel DL vector estimated by the user equipment, or a preferred dictionary of the user equipment so that the base station may select a dictionary for the user equipment according to its preference.

FIG. 5C illustrates a flow chart of another embodiment method 570 for wireless communications. In Step 572 of the method 570, a user may receive information for constructing a dictionary used for performing a compressed sensing (CS)-based downlink (DL) channel estimation of a base station which supports massive multiple-input and multiple-output (MIMO). The user equipment will perform the CS-based DL channel estimation using the dictionary constructed from the information in Step 574. The user equipment may construct a dictionary utilizing the received information as described in the embodiments of the present disclosure above. For example, the user equipment may construct the dictionary from a codebook of dictionaries using a set of codebook indexes received. In Step 576, the user equipment may transmit feedback information to the base station. The feedback information may include information as described above. For example, the feedback information may include information for determination of the dictionary for the user equipment.

Figure 6:
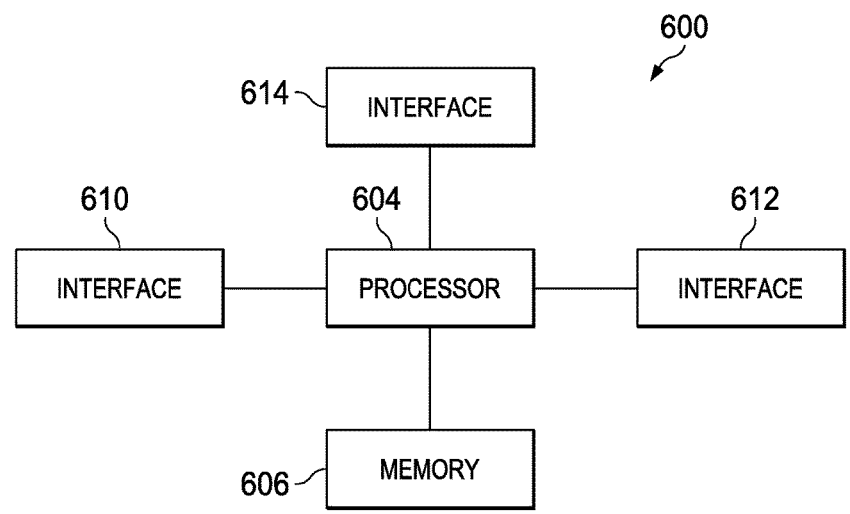
FIG. 6 illustrates a diagram of an embodiment processing system.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
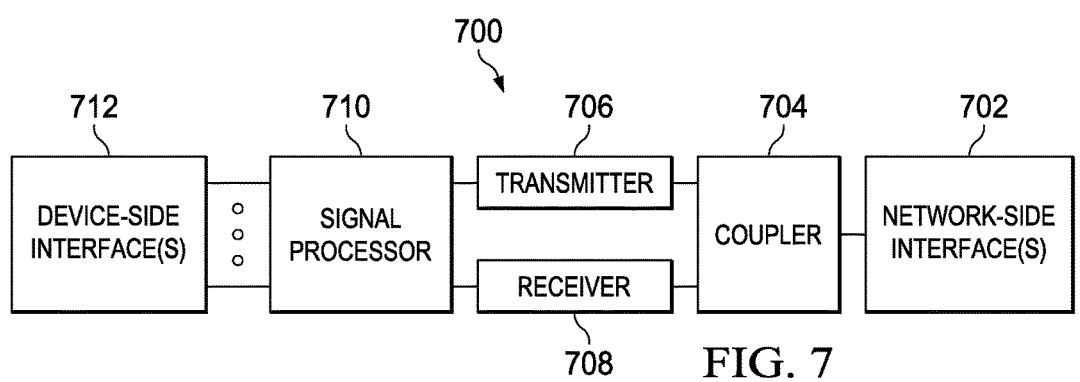
FIG. 7 illustrates a diagram of an embodiment transceiver.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single-input multiple-output (SIMO), multiple-input single-output (MISO), multiple-input multiple-output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for wireless communications, comprising:
   determining, by a base station, a first dictionary based on at least one of a channel quality indicator (CQI) and antenna array geometry;
   transmitting, by the base station to a first user equipment (UE), information for constructing the first dictionary, the first dictionary being used for compressed sensing (CS)-based downlink (DL) channel estimation of a massive multiple-input and multiple-output (MIMO) channel between the base station and the first UE;
   receiving, by the base station, feedback information from the first UE, the feedback information comprising information about a first sparsified DL channel vector used with the first dictionary for the CS-based DL channel estimation, and the first dictionary corresponding to a first representation of the massive MIMO channel;
   determining, by the base station, a second dictionary based on the feedback information, the second dictionary corresponding to a second representation of the massive MIMO channel, the second dictionary being used with a second sparsified DL channel vector for the CS-based DL channel estimation,. and the second representation being sparser than the first representation such that a number of non-zero entries in the second representation is less than a number of non-zero entries in the first representation; and
   transmitting, by the base station, information for constructing the second dictionary to the first UE, the second dictionary being used by the first UE to perform more accurate CS-based DL channel estimation of the massive MIMO channel.

2. The method of claim 1, further comprising:
   transmitting, by the base station, information for constructing a third dictionary to a second UE, the third dictionary being different than the first dictionary.

3. The method of claim 1, wherein the information for constructing the first dictionary comprises a mathematical description of the first dictionary.

4. The method of claim 1, wherein the base station selects the first dictionary from a codebook of dictionaries for the first UE.

5. The method of claim 4, wherein the information for constructing the first dictionary comprises a codebook index of the first dictionary.

6. The method of claim 4, wherein the feedback information comprises information indicating a preferred dictionary of the first UE for CS-based DL channel estimation.

7. The method of claim 4, wherein the feedback information comprises information of performance of multiple dictionaries used in CS-based DL channel estimation.

8. The method of claim 4, wherein the feedback information comprises information indicating concatenation of multiple dictionaries for CS-based DL channel estimation, the multiple dictionaries being selected from the codebook of dictionaries.

9. The method of claim 1, wherein the feedback information comprises information about a sparsified downlink channel vector calculated according to the first dictionary, the sparsified downlink channel vector being used for CS-based DL channel estimation.

10. The method of claim 1, wherein the transmitted information for constructing the determined first dictionary comprises the CQI, the antenna array geometry, and at least one of a user location, path-loss, or scattering environment.

11. The method of claim 1, wherein the feedback information comprises information about locations of non-zero entries of a sparsified DL vector, the sparsified DL vector being calculated according to the first dictionary, and the sparsified DL vector being used for CS-based DL channel estimation.

12. The method of claim 1, wherein the first representation comprises a first channel vector, and the first UE calculates the first channel vector based on the first dictionary.

13. A base station supporting massive multiple-input and multiple-output (MIMO), comprising:
 a processor; and
 a non-transitory computer readable storage medium storing programming for execution by the processor, the programming comprising instructions to:
  determine a first dictionary based on at least one of a channel quality indicator (CQI) and antenna array geometry;
  transmit information for constructing the first dictionary to a first user equipment (UE) for compressed sensing (CS)-based downlink (DL) channel estimation of a massive multiple-input and multiple-output (MIMO) channel between the base station and the first UE;
  receive feedback information from the first UE, the feedback information comprising information about a first sparsified DL channel vector used with the first dictionary for the CS-based DL channel estimation, and the first dictionary corresponding to a first representation of the massive MIMO channel;
  determine a second dictionary based on the feedback information, the second dictionary corresponding to a second representation of the massive MIMO channel, the second dictionary being used with a second sparsified DL channel vector for the CS-based DL channel estimation, and the second representation being sparser than the first representation such that a number of non-zero entries in the second representation is less than a number of non-zero entries in the first representation; and
  transmit information for constructing the second dictionary to the first UE, the second dictionary being used by the first UE to perform more accurate CS-based DL channel estimation of the massive MIMO channel.

14. The base station of claim 13, wherein the programming comprises further instructions to:
 transmit information for constructing a third dictionary to a second UE, the third. dictionary being different than the first dictionary.

15. The base station of claim 13, wherein the information for constructing the first dictionary comprises a mathematical description of the first dictionary.

16. The base station of claim 13, wherein the first dictionary is selected from a codebook of dictionaries.

17. The base station of claim 16, wherein the information for constructing the first dictionary comprises a codebook index of the first dictionary.

18. The base station of claim 16, wherein the feedback information comprises information indicating a preferred dictionary of the first UE for CS-based DL channel estimation.

19. The base station of claim 16, wherein the feedback information comprises information of performance of multiple dictionaries used in CS-based DL channel estimation by the first UE.

20. The base station of claim 16, wherein the feedback information comprises information indicating concatenation of multiple dictionaries for CS-based DL channel estimation, the multiple dictionaries being selected from the codebook of dictionaries.

21. The base station of claim 13, wherein the feedback information comprises information about a sparsified downlink channel vector calculated according to the first dictionary, the sparsified downlink channel vector being used for CS-based DL channel estimation.

22. A method, comprising:
 receiving, by a user equipment, information for constructing a first dictionary used for compressed sensing (CS)-based downlink (DL) channel estimation of a base station, the first dictionary being determined by the base station based on at least one of a channel quality indicator (CQI) and antenna array geometry;
 performing, by the user equipment, CS-based DL channel estimation of a massive multiple-input and multiple-output (MIMO). channel between the base station and the user equipment using the first dictionary constructed from the information, the first dictionary corresponding to a first representation of the massive MIMO channel;
 transmitting, by the user equipment, feedback information to the base station, the feedback information comprising information about a first sparsified DL channel vector used with the first dictionary for the CS-based DL channel estimation, the feedback information useful for determination of a second dictionary by the base station, the second dictionary being used with a second sparsified DL channel vector for the CS-based DL channel estimation, the second dictionary corresponding to a second representation of the massive MIMO channel, and the second representation being sparser than the first representation such that a number of non-zero entries in the second representation is less than a number of non-zero entries in the first representation;
 receiving, by the user equipment, information for constructing the second dictionary; and
 performing, by the user equipment, more accurate CS-based DL channel estimation of the massive MIMO channel using the second dictionary with the second sparsified DL channel vector.

23. The method of claim 22, wherein the information for constructing the first dictionary comprises a mathematical description of the first dictionary.

24. The method of claim 22, wherein the information for constructing the first dictionary comprises a codebook index of the first dictionary, the first dictionary being selected from a codebook of dictionaries.

25. The method of claim 24, wherein the performing the CS-based DL channel estimation comprises performing the CS-based DL channel estimation using the first dictionary and at least one dictionary selected from the codebook of dictionaries, the at least one dictionary being different from the first dictionary.

26. The method of claim 24, wherein the feedback information comprises information of a preferred dictionary of the user equipment for performing the CS-based DL channel estimation.

27. The method of claim 24, wherein the feedback information comprises information of performance of multiple dictionaries used in CS-based DL channel estimation by the user equipment.

28. The method of claim 24, wherein the feedback information comprises information indicating concatenation of multiple dictionaries for performing the CS-based DL channel estimation, the multiple dictionaries being selected from the codebook of dictionaries.

29. The method of claim 22, wherein the feedback information comprises information about a sparsified downlink channel vector calculated according to the first dictionary, wherein the user equipment performs the CS-based DL channel estimation according to the sparsified downlink channel vector and the first dictionary.

30. A user equipment, comprising:
a processor; and
a non-transitory computer readable storage medium storing programming for execution by the processor, the programming comprising instructions to:
receive information for constructing a first dictionary used for compressed sensing (CS)-based downlink (DL) channel estimation of a base station, the first dictionary being determined by the base station based on at least one of a channel quality indicator (CQI) and antenna array geometry;
perform CS-based DL channel estimation of a massive multiple-input and multiple-output (MIMO) channel between the base station and the user equipment using the first dictionary constructed from the information for constructing the first dictionary, the first dictionary corresponding to a first representation of the massive MIMO channel;
transmit feedback information, the feedback information comprising information about a first sparsified DL channel vector used with the first dictionary for the CS-based DL channel estimation, the feedback information useful for determination of a second dictionary by the base station, the second dictionary being used with a second sparsified DL channel vector for the CS-based DL channel estimation, the second dictionary corresponding to a second representation of the massive MIMO channel, and the second representation being sparser than the first representation such that a number of non-zero entries in the second representation is less than a number of non-zero entries in the first representation;
receive information for constructing the second dictionary; and
perform more accurate CS-based DL channel estimation of the massive MIMO channel using the second dictionary with the second sparsified DL channel vector.

31. The user equipment of claim 30, wherein the information for constructing the first dictionary comprises a mathematical description of the first dictionary.

32. The user equipment of claim 30, wherein the information for constructing the first dictionary comprises a codebook index of the first dictionary, the first dictionary being selected from a codebook of dictionaries.

33. The user equipment of claim 32, wherein the CS-based DL channel estimation is performed using the first dictionary and at least one dictionary selected from the codebook of dictionaries, the at least one dictionary being different from the first dictionary.

34. The user equipment of claim 32, wherein the feedback information comprises information of a preferred dictionary of the user equipment for performing the CS-based DL channel estimation.

35. The user equipment of claim 32, wherein the feedback information comprises information of performance of multiple dictionaries used in CS-based DL channel estimation.

36. The user equipment of claim 32, wherein the feedback information comprises information indicating concatenation of multiple dictionaries for performing CS-based DL channel estimation, the multiple dictionaries being selected from the codebook of dictionaries.

37. The user equipment of claim 30, wherein the feedback information comprises information about a sparsified downlink channel vector calculated according to the first dictionary, the sparsified downlink channel vector being used for CS-based DL channel estimation.

38. A method for wireless communications, comprising:
determining, by a base station, candidate dictionaries based on at least one of a channel quality indicator (CQI) and antenna array geometry, the base station supporting massive multiple-input and multiple-output (MIMO);
transmitting, by the base station to a first user equipment (UE), information for constructing the candidate dictionaries, the candidate dictionaries being used for compressed sensing (CS)-based downlink (DL) channel estimations; and
receiving, by the base station, feedback information from the first UE, the feedback information comprising information corresponding to a selected dictionary of the candidate dictionaries, the selected dictionary being selected by the first UE based on the CS-based DL channel estimations of a massive multiple-input and multiple-output (MIMO) channel between the base station and the first UE, and the selected dictionary corresponding to a representation of the massive MIMO channel, and the representation corresponding to the selected dictionary is the sparsest among representations of the massive MIMO channel corresponding to the candidate dictionaries such that a number of non-zero entries in the representation corresponding to the selected dictionary is the least, the selected dictionary being used with a sparsified DL channel vector for CS-based DL channel estimation.

* * * * *